May 13, 1930. H. J. SMITH 1,758,587
MACHINE FOR CUTTING SEED POTATOES
Filed March 15, 1928 2 Sheets-Sheet 1
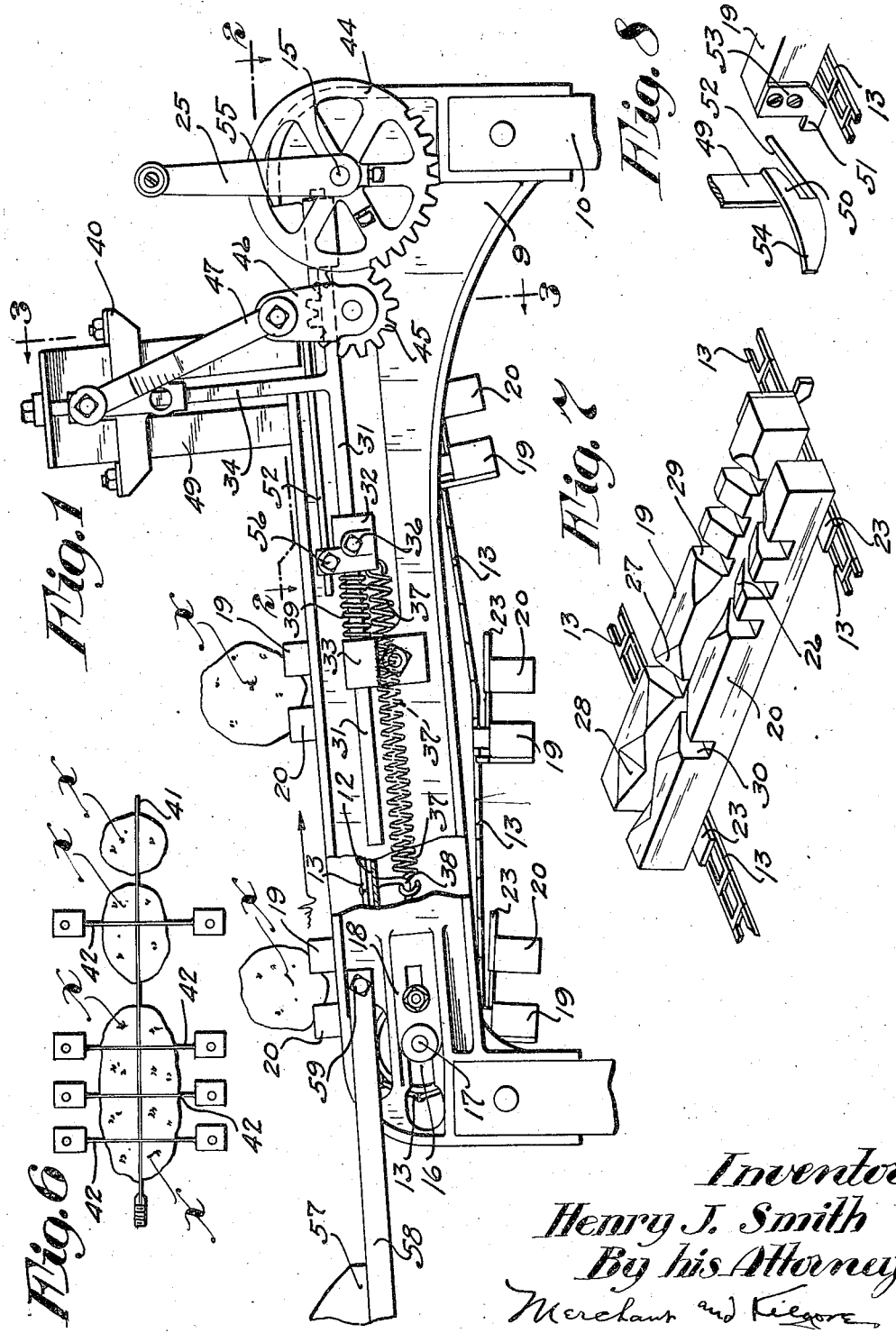
Inventor
Henry J. Smith
By his Attorneys
Merchant and Kilgore May 13, 1930. H. J. SMITH 1,758,587
MACHINE FOR CUTTING SEED POTATOES
Filed March 15, 1928 2 Sheets-Sheet 2
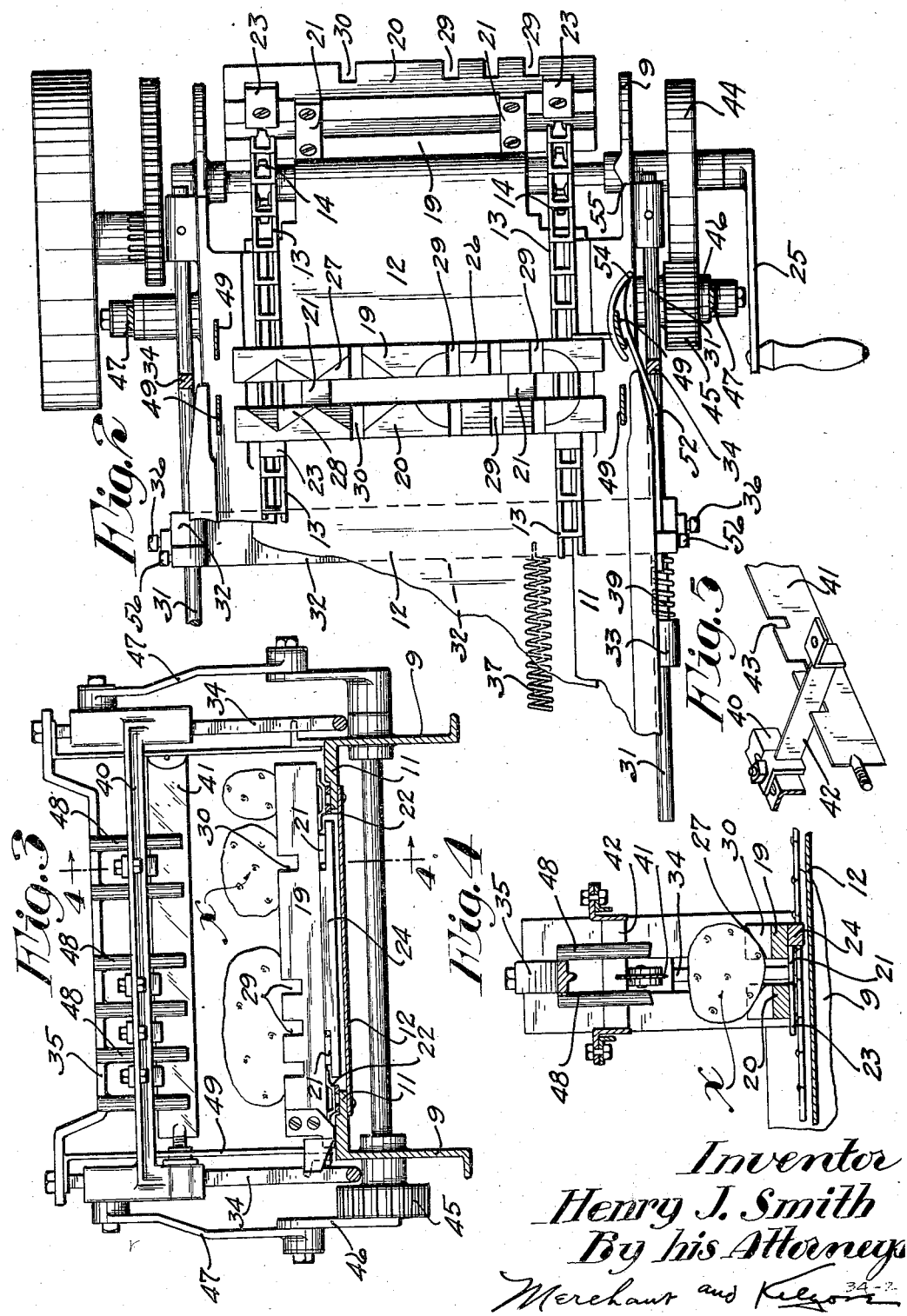
Inventor
Henry J. Smith
By his Attorneys
Merchant and Kilgore Patented May 13, 1930

1,758,587

UNITED STATES PATENT OFFICE

HENRY J. SMITH, OF MINNEAPOLIS, MINNESOTA

MACHINE FOR CUTTING SEED POTATOES

Application filed March 15, 1928. Serial No. 261,782.

My present invention has for its object to provide a highly efficient machine for cutting seed potatoes and the like, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary right side elevation of the machine;

Fig. 2 is a fragmentary view principally in plan showing the front end portion of the machine with some parts sectioned on the line 2—2 of Fig. 1;

Fig. 3 is a view partly in front elevation and partly in transverse vertical section taken on the line 3—3 of Fig. 1;

Fig. 4 is a detail view with some parts sectioned on the line 4—4 of Fig. 3;

Fig. 5 is a fragmentary perspective view of the cutter;

Fig. 6 is a plan view of the cutter removed from the machine;

Fig. 7 is a fragmentary perspective view of the conveyor; and

Fig. 8 is a fragmentary perspective view showing a portion of the conveyor and coupling for temporarily connecting the carriage thereto.

The numeral 9 indicates a frame supported on legs 10 and provided at its sides with a pair of longitudinally extended inner flat rails 11 having outer guide shoulders. Said frame 9 is further provided with a flat deck 12 which extends between the rails 11 and below the same. The legs 10 support the frame 9 with the rails 11 and deck 12 in forwardly inclined parallel planes.

A conveyor is mounted to travel longitudinally of the frame 9 with the upper section thereof above the deck 12 and with the lower section thereof below said deck. This conveyor comprises a pair of sprocket chains 13 arranged to run over a pair of front sprocket wheels 14 on a front transverse shaft 15 journaled in the side members of the frame 9 and a pair of rear sprockets 16 on a rear transverse shaft 17 journaled in bearings 18 adjustably mounted in said side members and act as tighteners for said chains. The upper sections of the sprocket chains 13 slidably rest on the rails 11 and the guide shoulders on said rails hold the conveyor for straightline-travelling over the deck 12.

The conveyor further includes a plurality of longitudinally spaced pairs of front and rear transverse bars 19 and 20, respectively. The bars 19 and 20 of each pair are rigidly connected and held laterally spaced by a pair of flat plates 21 attached to said bars at the bottom thereof between the sprocket chains 13. The bars 19 cross-connect the sprocket chains 13 and are attached thereto at 22. Wearing plates 23 on the bottoms of the rear bars 20 rest directly on the sprocket chains 13 and support said bars therefrom. The purpose of attaching only the front bars 19 to the sprocket chains 13 is to permit free movement of the sprocket chains 13 during their travel over the sprocket wheels 19 and 20.

On the bottom of each front bar 20 is a supplemental bar 24 which extends substantially the full distance between the sprocket chains 13 and during movement of the conveyor over the deck 12, sweeps said deck substantially clean.

The conveyor is operated by a hand crank 25 attached to the left-hand end of the shaft 15. The bars 19 and 20 afford holders for potatoes or the like and have in their opposing inner longitudinal edge portions, pairs of co-operating notches that afford seats 26, 27, and 28 for large, intermediate and small potatoes $x$. Three transverse notches 29 are formed in each pair of bars 19 and 20 at the seats 26 and divide the same into substantially four equal sections, and a single transverse notch 30 is also formed in said bars and divides the seat 27 into substantially two equal sections. The purpose of these two notches 29 and 30 will presently appear.

Mounted on the frame 9 is a carriage mounted to travel longitudinally thereof and comprises a pair of bars 31 intermediately and rigidly connected by a bottom crosstie bar 32. The end portions of the bars 31 are mounted in front and rear bearings 33 on the outer faces of the side members of the frame 9 and support the carriage for sliding movement longitudinally of the frame 9. The lower crosstie bar 32 extends transversely under the deck 12 and works in longitudinally extended slots in the side members of said frame. Said carriage further includes a pair of upright bars 34 integrally formed with the bars 31 at their intermediate portions. These upright bars 34 are rigidly connected at their upper ends by a top crosstie bar 35. The bottom crosstie bar 32 is rigidly but adjustably secured to the bars 31 by having in its ends bores through which said bars 31 extend. Set screws 36 in the crosstie bar 32 impinge against the bars 31 and rigidly but adjustably connect said bars 32 to the bars 31 with freedom for longitudinal adjustment thereon. The carriage is normally yieldingly held in a retracted position by a coiled spring 37 attached to the bottom of the crosstie bar 32 and anchored rearward thereof at 38 to the under side of the deck 12. Coiled buffer springs 39 for cushioning the return movement of the carriage encircle the bars 31 between the crosstie bar 32 and the rear bearings 33.

A crosshead 40 is mounted on the upright bars 30 of the carriage for vertical reciprocatory movement and carries a relatively long cutter blade 41 and a plurality of relatively short cutter blades 42 that intersect said blade 41. The cutter blade 41 extends transversely of the conveyor and is attached at its ends to the end members of the crosshead 40 and the cutter blades 42, as shown four in number, extend transversely over the cutter blade 41 and are attached at their ends to the longitudinal members of said crosshead. In order to permit the cutter blades 42 to start cutting before the cutter blade 41 has completed its cutting action, said cutter blade 41 has in its top or back a plurality of notches 43 into which the lower edge portions of the cutter blades 42 extend. The lower edges of the cutter blades 41 and 42 are ground sharp and said blades are detachably secured to the crosshead 40 so that they may be easily removed to be resharpened and then replaced. The cutter blade 41 during its cutting action is arranged to pass between the bars 19 and 20 of each pair during the travel of the conveyor and the cutter blades 42 are spaced to enter the notches 29 and 30 during their cutting action, as will presently appear.

The following connections are provided for reciprocating the crosshead 40 from the driving shaft 15, to wit:

An intermittent gear 44 is keyed to the shaft 15 between the hand wheel 15 and respective side member of the frame 9, and a co-operating intermittent pinion 45 is journaled to said side member. A crank arm 46 is rigidly secured to the shaft of the pinion 45 and a link 47 connects said crank to the crosshead 40. The arrangement of the teeth in the gear 44 and pinion 45 is such that when the smooth portion of said pinion is in contact with the smooth portion of said gear, the crosshead 40 is stationary and in its uppermost position. When the teeth of the gear 44 engage the teeth of the pinion 45, said pinion is given one complete rotation and moves said crosshead downward and causes the knives 41 and 42 to produce their cutting action and then returns said crosshead to its uppermost position where it remains idle for a predetermined period of time.

Strippers 48 between which the cutter blades 41 and 42 enter during their return movement, are attached to the top crosstie bar 45 for removing cut portions of the potatoes $x$ which may adhere by suction to said cutter blades.

To cut the potatoes $x$ without stopping the travel of the conveyor, the carriage is automatically and intermittently caused to travel with the conveyor for a predetermined distance, and then is automatically released. During this travel of the carriage, the spring 37 is placed under tension and when the carriage is released, returns said carriage to its retracted or normal position.

As one means of connecting the carriage to the conveyor, there is provided a coupler head 50 on the frame 9 arranged to be alternately engaged by coupling lugs 51 on adjacent ends of the bars 19. This coupler head 50 is carried on the front end of a horizontal spring rod 52 anchored to the crosstie member 32 of the carriage. Said coupler head 50 is further carried by one of the vertical guard strips 49. The coupling lugs 51 are secured to the outer face of the bars 19 by means of plates 53 with which they are integrally formed. Said spring rod 52 and the respective guard strip 49 yieldingly hold the coupling head 50 in the path of movement of the coupling lugs 51 but with freedom for lateral springing movement away from the conveyor to release the coupling lug 51. To release the coupler head 50 from the engaged coupling lug 51, said head is provided with a forwardly extended cam surface 54 arranged to engage a cam shoulder 55 on the right-hand side member of the frame 9 and spring the cam head 50 laterally from the conveyor and out of engagement with the engaged coupling lug 51. The spring rod 52 is mounted in a bore in the right-hand end of the crosstie bar 32 for endwise adjustment and rigidly held by a set screw 56. Obviously, the spring rod 52 may be endwise adjusted in the crosstie bar 32 to cause the coupler head 50 to be released from the conveyor at a predetermined time in respect to the cutter blades 41 and 42.

A relatively large shelf 57 for holding bulk potatoes to be cut for seed is supported from the receiving end of the machine by a pair of arms 58 pivoted at 59 to the frame 9. This pivotal mounting of the shelf 57 is such that when the machine is not in use, said shelf may be turned into an inoperative position in which it overlies the machine.

The operation of the above described machine may be briefly described as follows:

By turning the hand crank 25, continuous travelling movement will be imparted to the conveyor, an intermittent movement imparted to the carriage and an intermittent reciprocating movement imparted to the cutter blades 41 and 42 during the forward travel of the carriage. A workman at the machine takes the potatoes from the shelf 57 and places the same on the seats 26, 27 and 28 as the bars 19 and 20 are successively moved upward over the deck 12 at the receiving end of the machine. At the time the potatoes are placed on the seats they are sorted by placing the large potatoes on the seats 26, the medium sized potatoes on the seats 27, and the small potatoes on the seats 28.

During the forward travel of the upward section of the conveyor the coupling lugs 51 successively engage the coupling head 50 and thereby couple the carriage to the conveyor for common movement therewith. This coupling of the carriage to the conveyor is at a time when the bars 19 and 20 are so aligned with the cutter blades 41 and 42 that the cutter blade 41 when the crosshead 40 is moved downward, will enter midway between said two bars and the cutter blades 42 will, of course, enter the notches 29 and 30. This downward movement of the crosshead 40 is such that the cutter blades 41 and 42 will pass completely through the potatoes, thereby cutting the large potatoes in eight parts, the medium-sized potatoes in quarters, and the small potatoes in halves The arrangement of the cutter blades 41 and 42 is such that the cutter blades 42 start their cutting action before the cutter blade 41 has completed its cutting action. At the completion of the cutting of the potatoes the crank 46 will have assumed such a position that a return movement will be imparted to the crosshead 44 and at the limit of the upward stroke of said crank, the teeth of the gear 44 move out of engagement with the teeth on the pinion 45 and thereby cause the crosshead 40 to remain stationary in its uppermost position, as shown in Figs. 1, 3 and 4.

The cut potatoes will remain in the seats 26, 27 and 28 until the bars 19 and 20 pass downward around the sprocket wheels 14 and are then discharged into a pail, basket or other receptacle placed at the delivery end of the machine to receive the cut potatoes. As previously stated, in case any of the cut sections of the potatoes adhere by suction to the cutter blades 41 and 42, the strippers 48 will remove the same during the upward movement of the crosshead 40. In case some of the pieces of the potato drop on the deck 12 after they have been cut, the supplemental bars 24 will carry such pieces over the deck and discharge the same at the delivery end of the machine.

During the return or upward movement of the crosshead 40, the cam surface 54 of the coupling head 50 will engage the cam shoulder 55 and spring the coupling head 50 out of contact with the engaged coupling lug 51 and thereby release the carriage which is returned to normal position by the spring 37 which has been placed under tension during the travel of the carriage with the conveyor. This returning movement of the carriage by the spring 37 is cushioned by the buffer spring 39.

What I claim is:

1. In a machine of the class described, the combination with a frame, of a conveyor having a holder, operating means for the conveyor, a carriage, a cutter on the carriage, automatic means for intermittently coupling the carriage to the conveyor and position the cutter in a predetermined relation to the holder and then release said carriage, automatic means for intermittently operating the cutter in timed relation to the movement of the carriage with the conveyor, and automatic means for returning the released carriage to normal position.

2. In a machine of the class described, the combination with a frame, of a conveyor having a holder, operating means for the conveyor, a carriage, a crosshead on the carriage, a cutter on the crosshead, automatic means for intermittently coupling the carriage to the conveyor and position the cutter in a predetermined relation to the holder and then release said carriage, automatic means for intermittently reciprocating the crosshead to operate the cutter in timed relation to the movement of the carriage with the conveyor, and automatic means for returning the released carriage to normal position.

3. In a machine of the class described, the combination with a frame, of a conveyor having a holder, operating means for the conveyor, a carriage, a crosshead on the carriage, a cutter on the crosshead, automatic means for intermittently coupling the carriage to the conveyor with its holder in a predetermined position in respect to the cutter and then releasing said carriage, automatic means for intermittently reciprocating the crosshead to operate the cutter in timed relation to the movement of the carriage with the conveyor, connections arranged to be intermittently operated by the operating means for reciprocating the crosshead to operate the cutter in timed relation to the movement of the carriage with the conveyor, and means for returning the carriage to normal position.

4. In a machine of the class described, the combination with a frame, of an endless travelling conveyor having a plurality of longitudinally spaced holders, operating means for the conveyor, a carriage, a crosshead on the carriage, a cutter on the crosshead, a latch on the carriage, longitudinally spaced members on the conveyor arranged to successively engage the latch to connect the carriage to the conveyor and cause the same to move therewith and successively position the cutter in respect to the holders, automatic means for operating the latch after a predetermined movement of the carriage with the conveyor to release the same therefrom, connections arranged to be intermittently operated by the operating means to reciprocate the crosshead and operate the cutter in timed relation to the movement of the carriage with the cutter, and automatic means for returning the carriage to normal position.

In testimony whereof I affix my signature.

HENRY J. SMITH.